United States Patent [19]
Bronshvatch et al.

[11] Patent Number: 5,528,434
[45] Date of Patent: Jun. 18, 1996

[54] DISC CLAMP WITH INTEGRATED STIFFENER FOR HARD DISC DRIVES

[75] Inventors: Efim Bronshvatch, Saratoga; Ming-Goei Sheu, Cupertino; Hatem R. Radwan, San Jose, all of Calif.

[73] Assignee: Seagate Technology, Inc., Scotts Valley, Calif.

[21] Appl. No.: 402,453

[22] Filed: Mar. 10, 1995

[51] Int. Cl.$^6$ .................................................. G11B 17/02
[52] U.S. Cl. .................................. 360/98.08; 360/99.12
[58] Field of Search .......................... 360/98.01, 97.01, 360/98.07–99.01, 99.04, 99.05, 99.08–99.12; 369/270, 271

[56] References Cited

U.S. PATENT DOCUMENTS

| | | | |
|---|---|---|---|
| 4,561,035 | 12/1985 | McDorman et al. | 360/137 |
| 4,864,443 | 9/1989 | Peterson | 360/99.12 |
| 5,075,808 | 12/1991 | Johnson | 360/98.08 |
| 5,101,306 | 3/1992 | Johnson | 360/98.08 |
| 5,130,870 | 7/1992 | Jabbari | 360/99.08 |
| 5,274,517 | 12/1993 | Chen | 360/98.08 |
| 5,295,030 | 3/1994 | Tafreshi | 360/99.12 |
| 5,333,080 | 7/1994 | Ridinger et al. | 360/99.12 |
| 5,392,178 | 2/1995 | Nishio et al. | 360/99.08 |
| 5,414,575 | 5/1995 | Katakura | 360/98.08 |
| 5,452,157 | 9/1995 | Chow et al. | 360/98.08 |

FOREIGN PATENT DOCUMENTS 2-214079  8/1990  Japan .................................. 360/98.08

OTHER PUBLICATIONS

"Load Distributing Disk Clamp"; Research Disclosure, #266; Disclosed Anonymously; Kenneth Mason Publications.

*Primary Examiner*—Stuart S. Levy
*Assistant Examiner*—Jefferson Evans
*Attorney, Agent, or Firm*—Edward P. Heller, III

[57] ABSTRACT

A disc clamp formed in a circular shape from planar material. The disc clamp includes a central mounting portion having screw holes through which screws are inserted and fastened to matching tapped holes in the hub of the spindle motor. A circular corrugation is formed closely adjacent the outer diameter of the clamp forming a circular contact surface facing in the direction of the uppermost disc in a vertical stack of discs. A stiffening bend is formed at a radius lying between the central mounting portion and the circular corrugation to distribute the clamping force evenly between adjacent pairs of the screws. In a second aspect of the invention, the central mounting portion of the clamp includes a central opening and that part of the central mounting portion between the central opening and the stiffening bend is formed out-of-plane in the direction of the discs so that the central mounting portion will be substantially flattened onto the top of the hub of the spindle motor when the screws are tightened.

3 Claims, 4 Drawing Sheets

5,528,434

DISC CLAMP WITH INTEGRATED STIFFENER FOR HARD DISC DRIVES

FIELD OF THE INVENTION

The present invention relates generally to hard disc drives, and, more particularly, but not by way of limitation, to a disc clamp having an integrated stiffener for evenly distributing the clamping forces applied by a plurality of screws used to fasten the disc clamp to the hub of the disc drive spindle motor.

BRIEF DESCRIPTION OF THE PRIOR ART

Disc drive data storage devices of the type known as "Winchester" disc drives are well known in the industry. In such machines, digital data is recorded on and retrieved from a thin layer of magnetizable material on the surface of spinning discs. The recording and retrieval of data—also referred to as "writing" and "reading", respectively—is accomplished using a transducer carried in a slider body which includes a self-acting hydrodynamic air bearing which "flies" the transducer a very small distance above the surface of the disc. This slider/transducer subassembly is sometimes referred to collectively as a head, and typically a single head is associated with each disc surface. The heads are selectively moved, under control of electronic circuitry, to any one of a plurality of circular, concentric data tracks on the disc surface by an actuator device. In the current generation of rigid disc drive products, the most commonly used type of actuator is the rotary moving coil actuator. The discs themselves are typically mounted in a "stack" on the hub structure of a brushless DC spindle motor, and the rotational speed of the spindle motor is precisely controlled by motor drive circuitry which controls both the timing and power of commutation signals directed to the stator windings of the motor.

In early disc drives of this type manufactured in the 5 ¼ inch form factor, the data tracks on the disc surfaces were distributed on the disc surfaces at a radial track density of only 300–400 tracks per inch (tpi), and the heads were designed to fly approximately 12–14 μinches above the disc surfaces. Market demands for smaller form factors and increased data capacity have lead to current disc drive products with track densities in the range of 1800–2600 tpi or greater, and head flying heights of only 2.5–4.0 μinches or less.

The technological advances which have lead to the current families of products in the 2 ½ inch and smaller form factors have included improved heads, media, actuators and systems for controlling the movement of the heads between tracks.

The need to provide the maximum amount of storage capacity—and thus the maximum number of discs—in these small form factors has lead to the use of aluminum discs which are only 0.025 inches thick, and the expected use of glass discs only 0.015 inches thick. Furthermore, since these types of disc drives are intended for use in laptop and notebook types of computer systems, they are expected to withstand mechanical shocks in the range of 150–350 Gs. In order to meet such rigorous shock specifications, the clamping force used to secure the discs to the spindle motor must be on the order of 100–180 lb.

One of the areas of disc drive design which receives a great deal of attention is the apparatus used to secure the discs to the hub of the spindle motor. In a typical disc drive, the hub of the spindle motor includes a cylindrical disc mounting area which has an outer diameter substantially the same as the inner diameter of the discs. At one end of this disc mounting area, usually at the end toward the disc drive housing base member, is a radially extending disc mounting flange, which forms a platform against which an area local to the inner diameter of a disc can rest. In disc drives employing more than one disc, annular spacers are interposed between adjacent discs to form a "disc stack" made up of disc/spacer/disc . . . until all of the discs in the disc drive are stacked on the hub. Finally, to secure the disc stack to the spindle motor hub, some type of clamping device is employed to squeeze the disc stack against the disc mounting flange. This clamping is critical to the proper operation of the disc drive.

A typical type of disc clamp for securing the discs to a spindle motor is disclosed in U.S. Pat. No. 5,295,030, issued Mar. 15, 1994, assigned to the assignee of the present invention and incorporated herein by reference. In such a disc clamp, a contact area is circumferentially formed about the outer diameter of the disc clamp. This contact area is displaced out-of-plane from the remainder of the disc clamp in the direction intended to be toward the discs when the clamp is installed, and a plurality of screws, disposed radially inward from the contact area, attach the inner portion of the disc clamp to the spindle motor hub. In this manner, the juncture of the contact area and the unformed center of the disc clamp acts as a spring mechanism to clamp the inner diameter of the discs in place.

A problem arises with the use of this type of disc clamp, however, when the above noted disc thickness and clamping forces are considered. Since the disc clamp is secured with a plurality of screws circumferentially spaced about the periphery of the spindle motor hub, the majority of the clamping force is exerted at those locations radially opposite the screws, with a substantially lesser force applied to the discs in those areas radially between the screws. This variation in clamping force can cause the discs themselves to be mechanically distorted in a manner sometimes referred to as "potato chipping", meaning that the areas of the discs adjacent the disc clamp screws are displaced further from the disc clamp than the areas of the discs between the screws.

Distortion of the discs from an ideal flat condition leads to undesirable modulation of the read/write signals detected and produced by the heads of the disc drive. That is, since the heads will fly at varying heights about the circumference of the disc when attempting to follow a distorted disc, the signals used to write and read data on the discs may be inadequate to ensure reliable data storage and recovery.

This problem was addressed and solved in U.S. Pat. No. 5,333,080, issued Jul. 26, 1994, assigned to the assignee of the present invention and incorporated herein by reference. The disclosure of '080 included the addition of a shim between the upper surface of the topmost disc in the disc stack and the outer contact surface on the disc clamp. The circumferential length of the shim at the contact surface diameter was equal to one-third of the circumferential distance between adjacent disc clamp screws, and thus provided a redistribution of the clamping force about the entire diameter of the disc clamp. This solution to the problem of distribution of clamping force, however, did entail the manufacture and installation of an additional part in the disc drive, contributing, if only slightly, to the disc drive cost.

It would therefore be desirable to develop a mechanism which would aid in more evenly distributing the clamping force of the disc clamp about the inner diameter of the discs, thus reducing distortion of the discs and minimizing undesirable data signal modulation, without the use of additional components.

SUMMARY OF THE INVENTION

The present invention is a disc clamp formed in a circular shape from planar material. The disc clamp includes a central mounting portion having screw holes through which screws are inserted and fastened to matching tapped holes in the hub of the spindle motor. A circular corrugation is formed closely adjacent the outer diameter of the clamp forming a circular contact surface facing in the direction of the uppermost disc in a vertical stack of discs. A stiffening bend is formed at a radius lying between the central mounting portion and the circular corrugation to distribute the clamping force evenly between adjacent pairs of the screws. In a second aspect of the invention, the central mounting portion of the clamp includes a central opening and that part of the central mounting portion between the central opening and the stiffening bend is formed out-of-plane in the direction of the discs so that the central mounting portion will be substantially flattened onto the top of the hub of the spindle motor when the screws are tightened.

It is an object of the present invention to provide a disc clamp for mounting the discs in a hard disc drive to the hub of a spindle motor using a plurality of screws, and to evenly distribute the clamping force around a clamping surface closely adjacent the outer diameter of the disc clamp.

It is another object of the invention to provide a disc clamp which is both simple and economical to manufacture.

The features, benefits and advantages of the present invention may best be understood by reading the detailed description below in conjunction with reference to the included drawings.

DESCRIPTION OF THE PREFERRED EMBODIMENT

Figure 1:
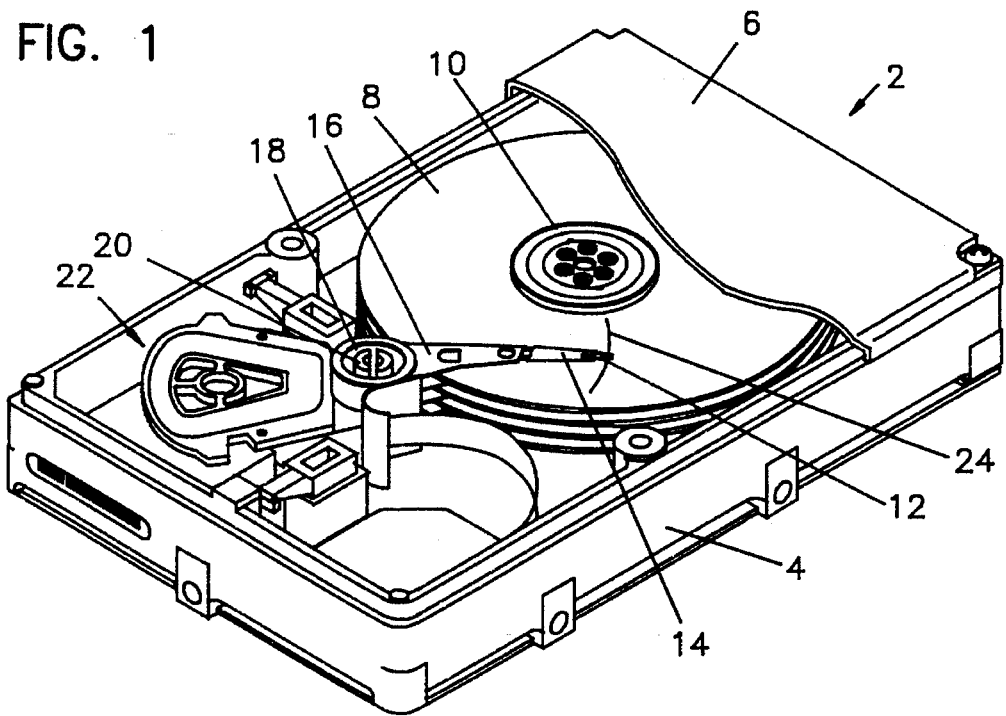
FIG. 1 is an isometric view in partial cutaway of a disc drive in which the present invention is particularly useful.

Turning now to the figures, and more specifically to FIG. 1, shown is a disc drive 2 of the type in which the present invention is particularly useful. The disc drive 2 includes a base member 4 to which all other components are either directly or indirectly mounted. A top cover 6, shown in partial cutaway, attaches to the base member to form a sealed housing within which the delicate read/write components are protected from outside contaminants.

The disc drive 2 includes at least one disc 8 mounted for rotation on a spindle motor (not shown) and held in place by a disc clamp 10. A plurality of read/write heads (one shown at 12) is mounted via flexure assemblies 14 to head mounting arms 16 which are integral portions of an actuator body 18 adapted to pivot about a pivot shaft 20 under control of an actuator motor, shown generally at 22. When the actuator motor 22 drives the actuator body 18 about the pivot shaft 20, the heads 12 are controllably moved back and forth along arcuate path 24 to any desired one of a plurality of circular, concentric data tracks (not shown) on the disc surface.

Figure 2A:
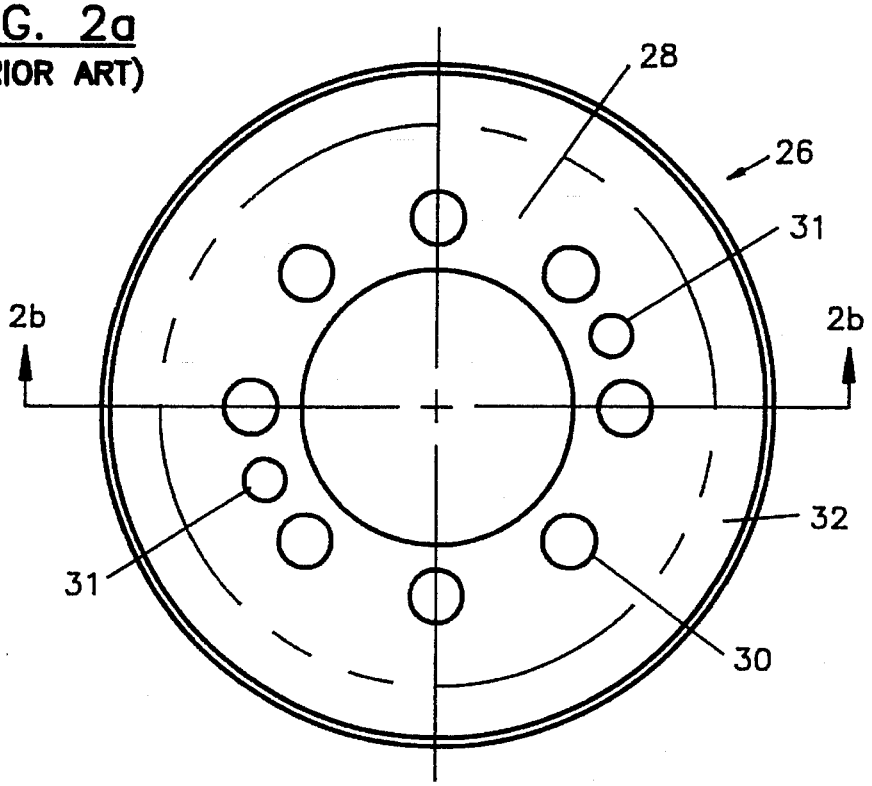
FIGS. 2a and 2b are plan and section views, respectively, of a typical prior art disc clamp.
Figure 2B:
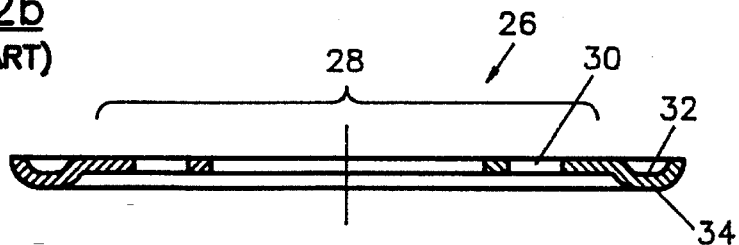

Turning now to FIGS. 2a and 2b, shown is a typical disc clamp 26 from the prior art. FIG. 2a is a plan view, while FIG. 2b is a sectional view taken along line 2b–2b of FIG. 2a. Such a disc clamp is formed from sheet material and includes a central mounting portion 28 with a plurality of screw holes 30 therein. Also shown is a pair of tooling holes 31, into which a spanner-type tool is inserted during assembly to keep the clamp and spindle motor from turning as the screws attaching the disc clamp 26 are tightened.

The disc clamp 26 also has a circular corrugation 32 formed closely adjacent its outer extremity. This circular corrugation 32 forms a circular contact surface 34 at that location which has been formed furthest out-of-plane from the central mounting portion 28. In use, the disc clamp 26 is attached to the hub of the disc drive spindle motor with a plurality of screws inserted through the screw holes 30. It is common for disc drives using this type of disc clamp for the hub of the spindle motor to be formed such that the upper surface of the spindle motor hub extends slightly beyond the upper surface of the top disc in the disc stack. When the disc clamp 26 is placed over the spindle motor hub, the contact surface 34 rests on the innermost portion of the uppermost disc, while a small gap exists between the top of the spindle motor hub and the central mounting portion 28 of the disc clamp 26. When the screws are inserted through the screw holes 30 and tightened into a mating plurality of tapped holes in the spindle motor hub, the disc clamp is deformed by having its central mounting portion pressed downward relative to the contact surface 34, and it is this deformation which results in the clamping force applied to the disc stack.

Use of this type of disc clamp does, however, have a significant drawback. Since that portion of the disc clamp 26 between the radius of the screws and the contact surface acts as a circular spring, the clamping force applied to the discs is concentrated at those areas directly opposite the screws, while those areas between the screws receive significantly less clamping force. This phenomenon is illustrated in FIG. 3.

Figure 3:
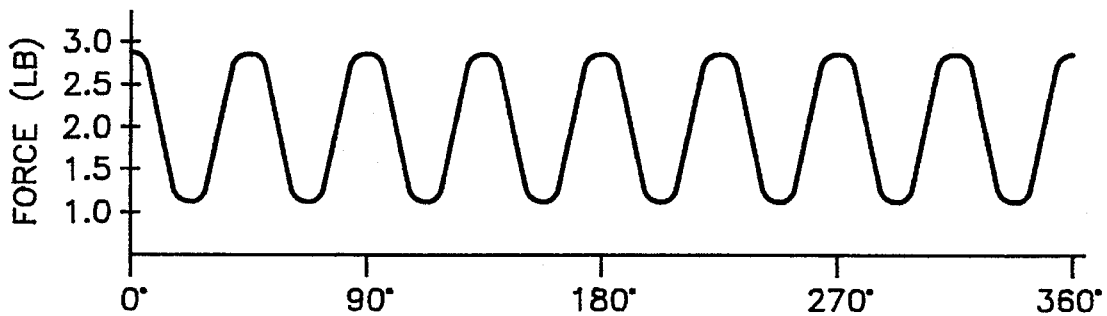
FIG. 3 is a diagrammatic representation of the clamping force distribution which is a result of utilizing the prior art disc clamp of FIG. 2.

FIG. 3 is a diagrammatic representation of the distribution of clamping force which results from the use of a typical prior art disc clamp, such as that of FIGS. 2a and 2b. In this diagrammatic representation, it is assumed that the disc clamp employs eight screws for attachment to the spindle motor hub. In the diagram, the horizontal scale represents one full circumference of the disc beginning at a location radially opposite one of the mounting screws, while the vertical scale represents the amount of clamping force locally applied to the discs. Since there are 8 screws in the example embodiment, locations opposite mounting screws occur every 45°. As can be readily seen in FIG. 3, the clamping force is greatest at those locations directly opposite the mounting screws, while the clamping force falls off to a minimum at those locations halfway between adjacent screws. It is this non-uniform distribution of clamping force which can result in a lack of desired flatness in the discs, as was discussed above.

Figure 4:
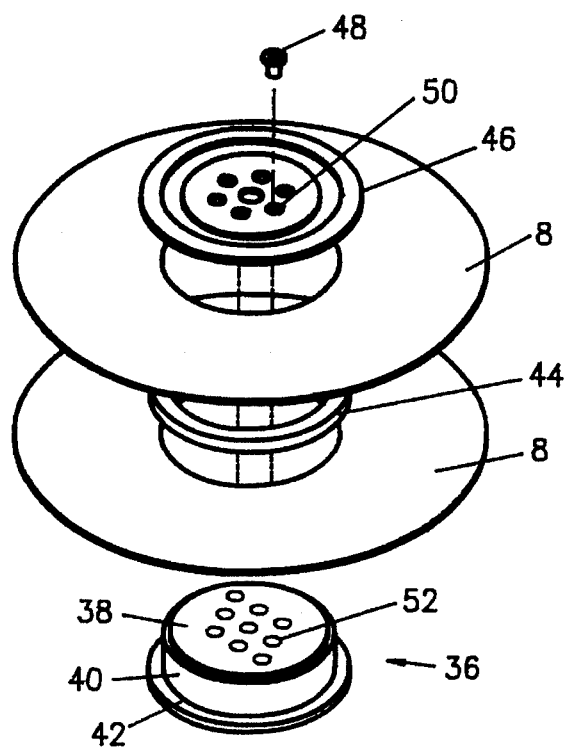
FIG. 4 is an exploded isometric view of the major elements of a disc clamping system utilizing the disc clamp of the present invention.

Turning now to FIG. 4, shown are the components of a disc clamping system which incorporates the disc clamp of the present invention. FIG. 4 shows a spindle motor, generally designated as 36, which includes a hub 38 on which are mounted, in this example, two discs 8. To facilitate the mounting of the discs 8, the hub 38 includes a cylindrical disc mounting portion 40 and a disc mounting flange 42 located at one end of the disc mounting portion 40 and extending outward radially therefrom. A disc spacer 44 is also shown which serves to separate the two discs 8 when they are assembled onto the spindle motor hub 38.

Also shown in FIG. 4 is a disc clamp 46 made in accordance with the present invention, which will be described in detail below. The disc clamp is attached to the spindle motor hub 38 with a plurality of screws (one shown and designated 48) which pass through screw holes 50 and engage tapped holes 52 in the spindle motor hub 38. The discs 8 and disc spacer 44 are thus captured and held fixedly between the disc mounting flange 42 on the spindle motor hub and the disc clamp 46. It should be born in mind that while a two-disc configuration is shown, the present invention should in no way be thought of as limited to such a combination, and is equally useful in disc drives having both more and less discs.

Figure 5:
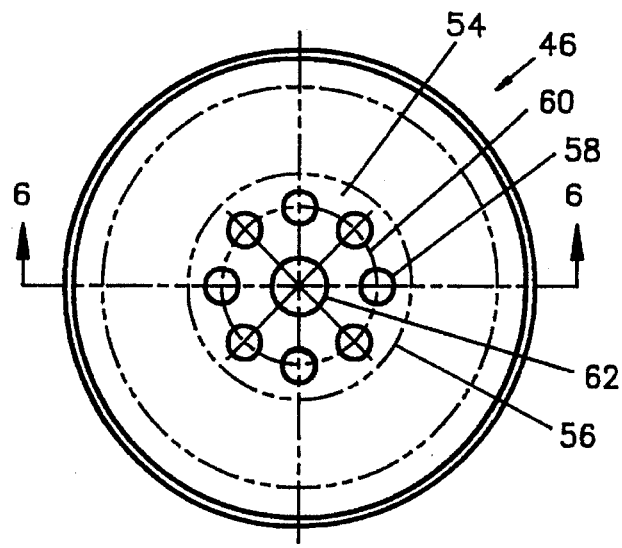
FIG. 5 is a plan view of a first embodiment of the disc clamp of the present invention.
Figure 6:
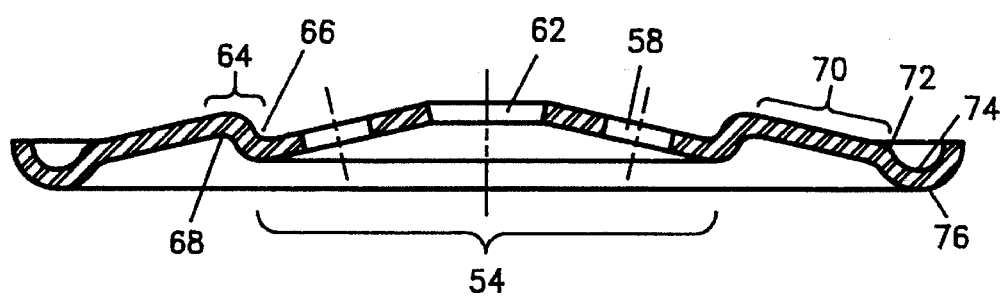
FIG. 6 is a section view of the disc clamp of FIG. 5 taken along line 6—6 of FIG. 5.

Turning now to FIGS. 5 and 6, shown are plan and section elevation views, respectively, with the section view of FIG. 6 taken along line 6—6 of FIG. 5, of a first embodiment of the disc clamp 46 of the present invention. The disc clamp 46 includes a central mounting portion which extends from the center of the disc clamp to a first radius 56. This central mounting portion 54 also includes a plurality of screw holes 58, eight in the embodiment illustrated, equally spaced about a circle having a second radius 60 which is less than the first radius 56. The central mounting portion 54 also has a central opening 62. One difference between the present invention and the prior art of FIGS. 2a and 2b is most apparent in the section view of FIG. 6. As clearly shown the central mounting portion 54 of the disc clamp 46 is bent downward from the center forming an obtuse conical shape. This conical central mounting portion will be deformed to a flat configuration upon assembly, as will be discussed below.

The disc clamp 46 also includes a stiffening bend 64 immediately outside and defining the extent of the central mounting portion 54. This stiffening bend 64 is actually a compound bend made up of a first bend 66 in the upward direction and a second bend 68 in the downward direction. The configuration of the two simple bends 66, 68 that make up the stiffening bend 64 are selected, along with the material thickness, such that the stiffening bend 64 forms a portion of the disc clamp 46 that is effectively non-bendable under the intended clamping force. In an example embodiment the disc clamp would be formed from 300-series, three-quarter-hardened stainless steel, and the two simple bends 66, 68 are formed with bend radii of 0.015 inch about centers which are radially separated by 0.042 inch. This configuration makes the stiffening bend 64 effectively unbendable under designed clamping forces.

Immediately outside the radius of the stiffening bend 64 is a spring portion 70 of the disc clamp 46, which is limited radially by a first contact-forming bend 72 again in the downward direction. The amount of bend in this example embodiment suffices to bring the plane of the spring portion 70 into parallel with the conical central mounting portion 54, although this parallel relationship is not mandatory to the operation of the present invention, as will be shown in regard to a second, presently preferred embodiment below. A second contact-forming bend 74 in the upward direction defines a circular contact surface 76 closely adjacent the outer extreme of the disc clamp 46, which is the sole contact between the disc clamp 46 and the uppermost disc in the complete assembly, as will be discussed below.

Figure 7A:
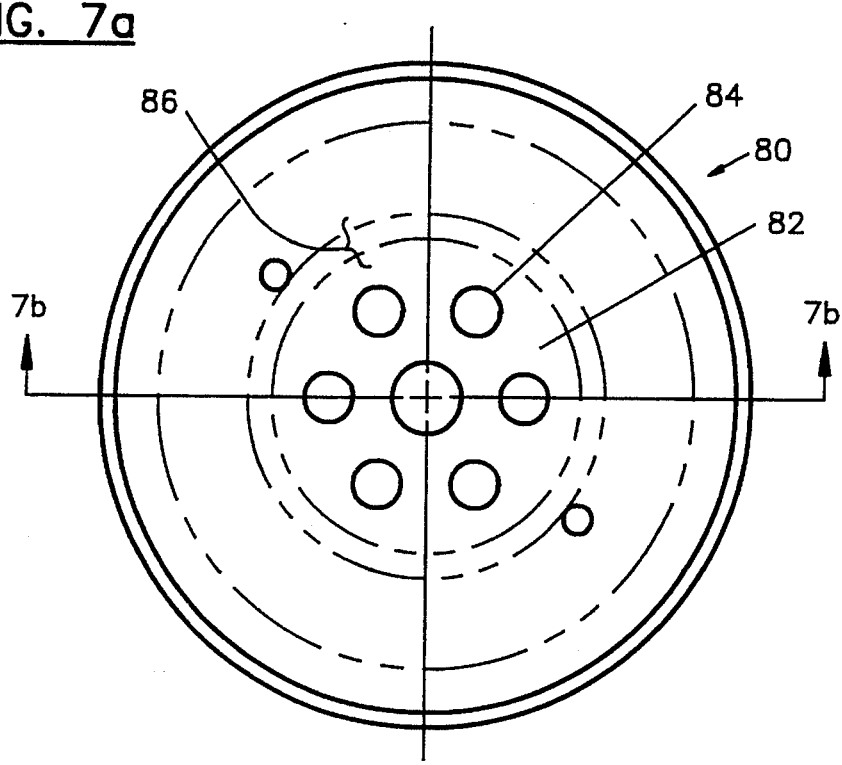
FIGS. 7a and 7b are plan and section views, respectively, of a second and presently preferred embodiment of the disc clamp of the present invention
Figure 7B:
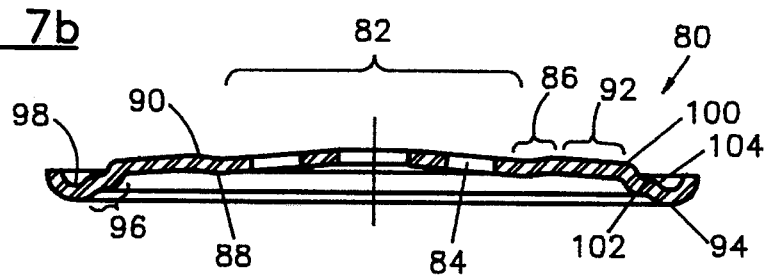

FIGS. 7a and 7b are a plan view and a section elevation view, taken along line 7b–7b of FIG. 7a, respectively, of a second and presently preferred embodiment of the invention. As can be seen, this embodiment of the disc clamp 80 is similar to the embodiment shown in FIGS. 5 and 6, with several differences. Firstly, the central mounting portion 82 now includes only six screw holes 84, since it was found that the stiffening bend 86 was sufficiently stiff to allow the use of this lesser number of screws, without negatively impacting the distribution of clamping force, while lowering the parts count and manufacturing cost. Once again, the stiffening bend 86 is actually a compound bend made up of a first simple bend 88 in the upward direction and a second simple bend 90 in the downward direction.

The disc clamp 80 also includes a spring portion 92 and a contact surface 94 formed by a first contact-forming bend 96 and a second contact-forming bend 98. Detailed examination of FIG. 7b will show that the first contact-forming bend 96 is actually a compound bend, made up of three simple bends: a first downward bend 100, a second upward bend 102 and a third downward bend 104. This compound bend 96 was created to provide a surface for the attachment of a balancing apparatus, such as that described in U.S. Pat. No. 5,130,870, issued Jul. 14, 1992, assigned to the assignee of the present invention. It is desirable that the second contact-forming bend 98 be made on a radius which is small, such as 0.018 inch, in order to limit the outer diameter of the disc clamp 80 and maintain the same size of the contact surface. However, such a narrow bend did not afford adequate room for the attachment of a balance weight. Therefore, the compound first contact-forming bend 96 provides a "stepped" area which allows the addition of the balance weight, without increasing the outer diameter of the disc clamp 80. An increase in the outer diameter of the disc clamp 80 would reduce the area of the disc surfaces available for data storage.

Figure 8:
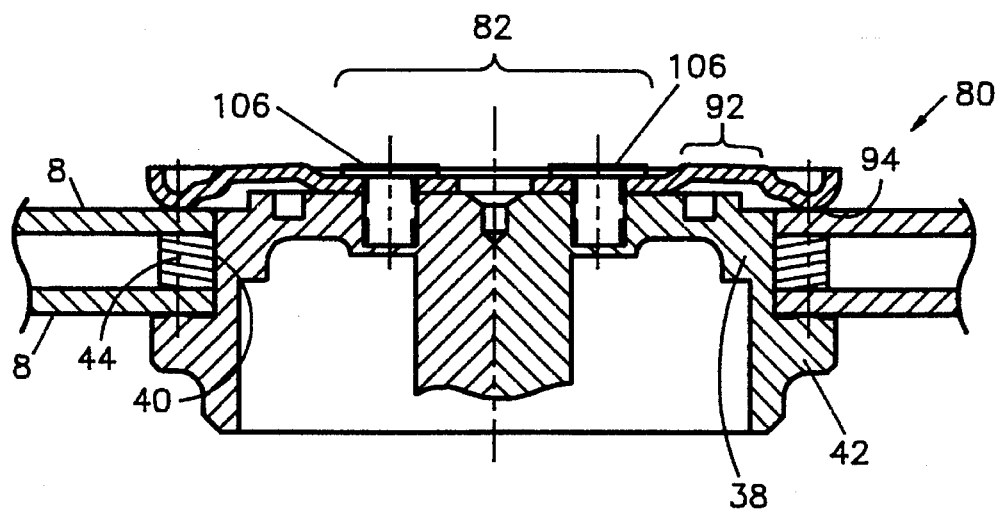
FIG. 8 is a section view of a spindle motor hub/disc/disc clamp assembly incorporating the disc clamp of FIGS. 7a and 7b.

The operation of the disc clamp 80 as a part of a disc clamping system is illustrated in FIG. 8. In FIG. 8, the disc clamp 80 is shown in section elevation view, as are the spindle motor hub 38, two discs 8 and a disc spacer 44, in a configuration similar to that shown in the exploded view of FIG. 4. As can be seen, the spindle motor hub 38 includes a cylindrical disc mounting portion 40 with a diameter substantially the same as the inner diameter of the discs 8, and a disc mounting flange 42 at the bottom of the disc mounting portion 40, which extends radially from the disc mounting portion 40.

A plurality of screws 106 (two shown) have been inserted through the screw holes (84 in FIGS. 7a and 7b) and into corresponding tapped holes in the spindle motor hub 38. When the screws 106 are tightened, the conical central mounting portion 82 of the disc clamp 80 is flattened, and the spring portion 92 of the disc clamp is brought into parallel relationship with the surfaces of the discs 8. The tightening of the screws 106 also serves to press the contact surface 94 of the disc clamp 80 onto the inner portion of the uppermost disc 8, capturing the discs 8 and disc spacer 44 between the disc clamp 80 and the disc mounting flange 42 on the spindle motor hub 38.

Figure 9:
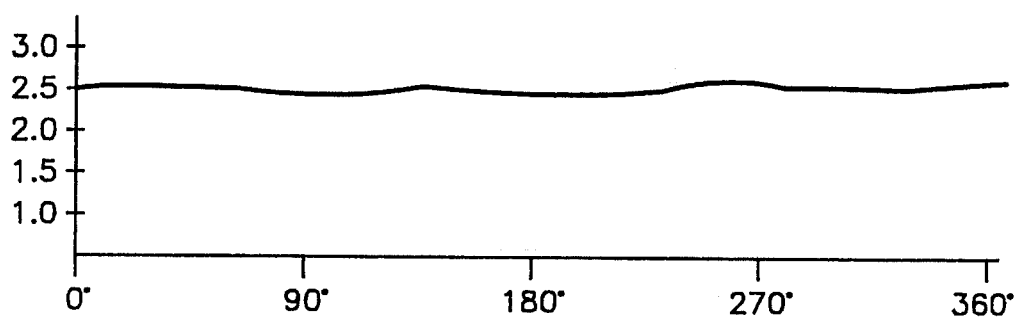
FIG. 9 is a diagrammatic representation of the clamping force distribution which is a result of utilizing the disc clamp of the present invention.

The effectiveness of the disc clamp of the present invention in evenly distributing the clamping force to the disc stack is illustrated in FIG. 9, which is a diagrammatic representation of the local clamping force applied around the full diameter of the disc clamp. The vertical scale is the force applied in pounds and the horizontal scale is a linear representation of the full 360° of the clamp. As can be seen, the preferred embodiment of the disc clamp of the present invention applies a very even clamping force of approximately 2.5 pounds all around the contact surface. The reduction in the variability of clamping force is most apparent when FIG. 9 is compared to FIG. 3, which showed the clamping force distribution for the prior art disc clamp of FIGS. 2a and 2b.

It has been determined that all of the features of the disc clamp of the present invention can be produced in a single manufacturing step. That is, flat stock material is placed in an appropriate stamping die and all bends, through holes and the overall outline of the disc clamp are formed with a single stamping operation, thus minimizing manufacturing costs.

It is clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims. The scope of the invention is therefore intended to be limited only by the following claims.

What is claimed is:

1. A disc clamp for fixedly mounting at least one disc in relation to a hub of a spindle motor, the disc clamp being formed from planar sheet material having first and second material sides, and comprising:

a central mounting portion extending from a center of the disc clamp to a first radius, the central mounting portion including a plurality of screw holes equally spaced at a second radius less than the first radius, the central mounting portion being formed toward the first material side into an obtuse conical shape;

a stiffening bend located immediately outside the first radius;

a spring portion extending outward from the stiffening bend to a third radius, and;

a contact surface for contacting the inner diameter of a top surface of said at least one disc, the contact surface formed by a first contact-forming bend at substantially the third radius toward the first material side and a second contact-forming bend at a radius greater than the third radius toward the second material side.

2. A disc clamp as claimed in claim 1 wherein the stiffening bend is a compound bend comprising a first simple bend at substantially the first radius in the direction of the second material side, and a second simple bend at a radius greater than the first radius in the direction of the first material side.

3. A disc clamp as claimed in claim 1 wherein the first contact-forming bend is a compound bend comprising:

a first simple bend at substantially the third radius in a direction toward the first material side;

a second simple bend at a fourth radius greater than the third radius in the direction of the second material side, and;

a third simple bend at a fifth radius greater than the fourth radius in the direction of the first material side.

* * * * *